United States Patent
Padiyath et al.

(10) Patent No.: US 9,945,525 B2
(45) Date of Patent: Apr. 17, 2018

(54) HYBRID LIGHT REDIRECTING AND LIGHT DIFFUSING CONSTRUCTIONS

(71) Applicant: 3M INNOVATIVE PROPERTIES COMPANY, St. Paul, MN (US)

(72) Inventors: Raghunath Padiyath, Woodbury, MN (US); Bing Hao, Woodbury, MN (US); Charles A. Marttila, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/401,657

(22) Filed: Jan. 9, 2017

(65) Prior Publication Data

US 2017/0114972 A1    Apr. 27, 2017

Related U.S. Application Data

(63) Continuation of application No. 14/631,385, filed on Feb. 25, 2015, which is a continuation of application
(Continued)

(51) Int. Cl.
*F21S 11/00* (2006.01)
*G02B 5/04* (2006.01)
(Continued)

(52) U.S. Cl.
CPC .......... *F21S 11/007* (2013.01); *G02B 5/0278* (2013.01); *G02B 5/045* (2013.01);
(Continued)

(58) Field of Classification Search
CPC ............... F21S 11/002; G02B 5/045
(Continued)

(56) References Cited

U.S. PATENT DOCUMENTS

| | | |
|---|---|---|
| 3,610,724 A | 10/1971 | Frizzell |
| 3,711,176 A | 1/1973 | Alfrey |

(Continued)

FOREIGN PATENT DOCUMENTS

| | | |
|---|---|---|
| CA | 2598729 | 2/2009 |
| EP | 0201920 | 11/1986 |

(Continued)

OTHER PUBLICATIONS

Smith, "Modern Optic Engineering; A design of optical system", 104-105 (1966).
(Continued)

*Primary Examiner* — Christopher Mahoney
(74) *Attorney, Agent, or Firm* — Jeffrey M. Olofson (57) ABSTRACT

Solar light redirecting glazing units include light redirecting and light diffusing constructions. The solar light redirecting glazing units may include a glazing substrate, a visible light diffusing layer, and a light redirecting layer oriented such that incoming solar light contacts the visible light diffusing layer before contacting the light redirecting layer. The solar light redirecting glazing units may include a glazing substrate, a patterned visible light diffusing layer, and a light redirecting layer. The solar light redirecting glazing units may include two glazing substrates separated by an intervening space with a solar light redirecting layer disposed on one glazing substrate, and a visible light diffusing layer disposed on the other glazing substrate.

9 Claims, 3 Drawing Sheets

Related U.S. Application Data

No. 14/008,372, filed as application No. PCT/US2012/028693 on Mar. 12, 2012, now Pat. No. 8,995,059.

(60) Provisional application No. 61/469,147, filed on Mar. 30, 2011.

(51) Int. Cl.
  *G02B 5/02* (2006.01)
  *G02B 19/00* (2006.01)
  *G02B 5/20* (2006.01)

(52) U.S. Cl.
  CPC .......... *G02B 5/208* (2013.01); *G02B 19/0009* (2013.01); *G02B 19/0042* (2013.01)

(58) Field of Classification Search
  USPC .......................................... 359/592–594, 597
  See application file for complete search history.

(56) References Cited

U.S. PATENT DOCUMENTS

| | | |
|---|---|---|
| 3,841,890 A | 10/1974 | Coaker |
| 4,144,217 A | 3/1979 | Snelgrove |
| 4,446,305 A | 5/1984 | Rogers |
| 4,540,623 A | 9/1985 | Im |
| 4,557,565 A | 12/1985 | Ruck |
| 4,568,445 A | 2/1986 | Cates |
| 4,657,355 A * | 4/1987 | Negishi ................. F24J 2/0433 359/742 |
| 4,693,935 A | 9/1987 | Mazurek |
| 4,721,377 A | 1/1988 | Fukuda |
| 4,773,733 A * | 9/1988 | Murphy, Jr. ............ E06B 9/386 160/176.1 R |
| 4,799,745 A | 1/1989 | Meyer |
| 4,812,032 A | 3/1989 | Fukuda |
| 4,989,952 A | 2/1991 | Edmonds |
| 5,237,004 A | 8/1993 | Wu |
| 5,424,339 A | 6/1995 | Zanka |
| 5,448,404 A | 9/1995 | Schrenk |
| 5,534,386 A | 7/1996 | Petersen |
| 5,882,774 A | 3/1999 | Jonza |
| 6,007,901 A | 12/1999 | Maschwitz |
| 6,045,894 A | 4/2000 | Jonza |
| 6,111,696 A | 8/2000 | Allen |
| 6,163,402 A | 12/2000 | Chou |
| 6,355,754 B1 | 3/2002 | Olson |
| 6,531,230 B1 | 3/2003 | Weber |
| 6,608,722 B2 | 8/2003 | Cowan |
| 6,613,402 B2 | 9/2003 | Fulton |
| 6,616,285 B2 | 9/2003 | Milner |
| 6,700,716 B2 | 3/2004 | Sejkora |
| 6,887,917 B2 | 5/2005 | Yang |
| 2001/0022982 A1 | 9/2001 | Neavin |
| 2005/0147838 A1 | 7/2005 | Olson |
| 2005/0254130 A1 | 11/2005 | Graf |
| 2006/0154049 A1 | 7/2006 | Padiyath |
| 2008/0182958 A1 | 7/2008 | Lafleur |
| 2008/0291541 A1 | 11/2008 | Padiyath |
| 2009/0009870 A1 | 1/2009 | Usami |
| 2010/0007962 A1 * | 1/2010 | Hughes ................. E06B 3/6715 359/613 |
| 2010/0128349 A1 | 5/2010 | Menez |
| 2010/0297406 A1 | 11/2010 | Schaffer |
| 2011/0043919 A1 | 2/2011 | Ko |
| 2011/0262726 A1 * | 10/2011 | Knoll ...................... C03C 17/36 428/213 |
| 2011/0296726 A1 * | 12/2011 | Rinko .................... B32B 38/06 40/561 |
| 2014/0133030 A1 * | 5/2014 | Gardiner ................ G02B 5/045 359/592 |

FOREIGN PATENT DOCUMENTS

| | | |
|---|---|---|
| EP | 0234089 | 9/1987 |
| EP | 0753121 | 1/1997 |
| FR | 353437 | 9/1905 |
| JP | 58068701 A * | 4/1983 |
| JP | 1993-295863 | 11/1993 |
| JP | 2001-90277 | 4/2001 |
| JP | 2009-266794 | 11/2009 |
| TW | M333649 | 6/2008 |
| TW | M337075 | 7/2008 |
| WO | WO 1997-01610 | 1/1997 |
| WO | WO 1999-39224 | 8/1999 |
| WO | WO 2000-010929 | 3/2000 |
| WO | WO 2003-071079 | 8/2003 |
| WO | WO 2005-005162 | 1/2005 |
| WO | WO 2008-144217 | 11/2008 |
| WO | WO 2008-147632 | 12/2008 |
| WO | WO 2010-033571 | 3/2010 |
| WO | WO 2011-033413 | 3/2011 |
| WO | WO 2011-084303 | 7/2011 |
| WO | WO 2011-084391 | 7/2011 |
| WO | WO 2013-012858 | 1/2013 |

OTHER PUBLICATIONS

International Search Report for PCT International Application No. PCT/US2012/028693, dated Sep. 24, 2012, 3 pages.

* cited by examiner

HYBRID LIGHT REDIRECTING AND LIGHT DIFFUSING CONSTRUCTIONS

RELATED CASES

This application is a continuation application of U.S. Ser. No. 14/631,385, filed on Feb. 25, 2015, now allowed, which is a continuation of U.S. Ser. No. 14/008,372, filed on Mar. 12, 2012 as a US 371-PCT/US2012/028693, now issued as U.S. Pat. No. 8,995,059, which claims priority to U.S. Provisional Application No. 61/469,147, Mar. 30, 2011.

FIELD OF THE DISCLOSURE

This disclosure relates generally to light redirecting constructions, especially solar light redirecting glazing units.

BACKGROUND

A variety of approaches are used to reduce energy consumption in buildings. Among the approaches being considered and applied is the more efficient use of sunlight to provide lighting inside buildings. One technique for supplying light inside of buildings, such as in offices, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

A variety of articles have been developed to redirect sunlight to provide illumination within rooms. A light deflecting panel is described in U.S. Pat. No. 4,989,952 (Edmonds). These panels are prepared by making a series of parallel cuts in a sheet of transparent solid material with a laser cutting tool. Examples of daylighting films include European Patent No. EP 0753121 and U.S. Pat. No. 6,616,285 (both to Milner) which describe optical components that include an optically transparent body with a plurality of cavities. Another daylighting film is described in U.S. Pat. No. 4,557,565 (Ruck et al.), which describes a light deflecting panel or plate which is formed of a plurality of parallel identically spaced apart triangular ribs on one face. Examples of films that have a plurality of prism structures are described in US Patent Publication No. 2008/0291541 (Padiyath et al.) and pending U.S. Patent Applications: Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.).

A number of articles have been developed to scatter or diffuse light. In U.S. Pat. No. 6,608,722 (Cowan et al.), a diffuser is disclosed that transmits or reflects incident light into a specific range of angles. The diffuser consists of two parts, the first part diffracts or reflects light into a specific offset angle, the second part uniformly scatters the light through a range of angles. In U.S. Pat. No. 5,534,386 (Petersen et al.), a homogenizer for incident light includes a sheet of embossable material including one micro-sculpted surface relief structure that controls the direction in which light propogates and homogenizes light with directionality. U.S. Pat. No. 6,613,402 (Chou et al.) disclosed a rear projection screen assembly that includes a diffuser and a polarizer. The PCT Publication No. WO 00/10929 (Savant) discloses a surface light shaping diffuser by embossing or molding light shaping structures onto a high quality optical glass. Particles have been used to scatter or diffuse light. US Patent Publication No. 2008/0182958 (Lafleur et al.) describes light scattering polymer particles that have a different refractive index at the center of the particle than at the shell of the particle, and also discloses dispersing the particles in a polymeric matrix. A number of references describe light diffusing or light scattering films that comprise particles dispersed within a matrix. In U.S. Pat. No. 5,237,004 (Wu et al.) the matrix is a thermoplastic or thermoset polymer composition, in PCT Publication Nos. WO 97/01610 (Goetz et al.) and WO 2010/033571 (Sherman et al.) the matrix is a pressure sensitive adhesive, and in PCT Publication No. WO 2008/144217 (Padiyath et al.) a light diffusing solar control film includes a multilayer film that transmits visible light and reflects infrared light, and a light diffusing layer or surface. PCT Publication No. WO 2010/0297406 (Schaffer et al.) describes a light diffusing adhesive that includes an adhesive matrix and a block copolymer that forms light diffusing microdomains within the adhesive matrix. PCT Publication No. WO 2005/005162 (Hayashi et al.) describes a shading decorative sheet that includes a thermoplastic resin film with a decorative layer provided on its front face, where the decorative pattern has a gradation pattern in at least one direction.

SUMMARY

Disclosed herein are hybrid light redirecting and light diffusing constructions. These light redirecting and light diffusing constructions comprise solar redirecting glazing units. In some embodiments, the solar light redirecting glazing units comprise a first glazing substrate, a visible light diffusing layer disposed on the first glazing substrate, and a light redirecting layer adjacent to the visible light diffusing layer. The light redirecting layer comprises a major surface forming a plurality of prism structures. The visible light diffusing layer and light redirecting layer are oriented such that incoming solar light contacts the visible light diffusing layer before contacting the light redirecting layer.

In other embodiments, the solar light redirecting glazing units comprise a first glazing substrate, a patterned visible light diffusing layer, and a light redirecting layer adjacent to the visible light diffusing layer. The light redirecting layer comprises a major surface forming a plurality of prism structures.

In still other embodiments, the solar light redirecting glazing units comprise a first glazing substrate comprising a first major surface and a second major surface, a solar light redirecting layer disposed on the first major surface of the first glazing substrate, a second glazing substrate comprising a first major surface and a second major surface, a visible light diffusing layer disposed on the first major surface of the second glazing substrate, and an intervening space between the solar light redirecting layer and the visible light diffusing layer. The solar light redirecting layer comprises a major surface forming a plurality of prism structures.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Windows and similar constructions are used to provide natural sunlight to rooms, corridors, and the like, in buildings. However, the angle that natural sunlight falls upon windows is such that typically the light may not penetrate far into the room or corridor. Additionally, since the incoming light may be unpleasantly strong near the window, users sitting near the window may be induced to close shutters, blinds or curtains and thus eliminate this potential source of room illumination. Therefore constructions that can redirect sunlight from the normal incident angle to a direction towards the ceiling of a room, corridor, or other indoor space would be desirable.

Another issue with the increased use of natural lighting is the presence of glare. Glare is a commonly encountered phenomenon, experienced whenever sunlight is present. Glare can be defined as the contrast lowering effect of stray light in a visual scene. Glare can be divided into two types: discomfort glare and disability glare. Discomfort glare refers to the sensation one experiences when the overall illumination is too bright, for example on a snowy field under a bright sun. Disability glare refers to the reduced visibility of a target due to the presence of a light source elsewhere in the field. It occurs when light from a glare source is scattered by the ocular media. This scattered light forms a veil of luminance which reduces the contrast and thus the visibility of the target. Both of these types of glare are an issue with windows that use natural light to illuminate a room, office, or other indoor space. As described above for incoming light that is unpleasantly strong near the window, glare can also be eliminated through the use of shutters, blinds or curtains and the like, but such methods reduce or eliminate the desirable natural lighting. It is desirable to reduce or eliminate glare without completely blocking the transmission of visible light.

The use of daylight redirecting films on windows to direct light towards the ceiling of a room, corridor or other indoor space to enhance the natural lighting in the room, corridor or other indoor space can actually increase the issues with glare, since at least some of the incoming light is also directed downward into the room instead of upwards toward the ceiling. This effect can be minimized through the design of the light redirecting elements of the film such as is described in the pending U.S. Patent Applications: Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.). However, even with these techniques, some light can be directed into the room to contribute to glare. Additionally, since the light redirecting elements typically are light refracting prisms, some splitting of the incoming white sunlight into its component colors can occur. This splitting into component colors is not desirable.

Therefore, glazing constructions are desirable that include the features of redirection of incoming sunlight towards the ceiling of a room, corridor or other indoor space without increasing the glare or causing the incoming sunlight to be split into the component colors. These desirable outcomes may be achieved through the use of a hybrid glazing construction that comprises both a light redirecting element and a visible light diffusion element. These hybrid constructions may take a variety of different forms such as a multilayer film article or as separate film or substrate layers, and the constructions may be configured in a variety of different ways.

The glazing constructions, regardless of their configuration, generally have a desirable balance of optical properties, such as transmission of visible light, haze and clarity. Generally it is desirable to have a visible light transmission (% T) of at least 50%. In some embodiments, the % T is 60%, 70%, 80%, 85%, 90%, or even 95%. The % T is impacted by a variety of factors (such as the absorption, refractive index and surface topography of the materials used) including the level of haze in the glazing construction, because haze measures the amount of light that is scattered. Generally, it is desirable that the glazing constructions have a haze value of at least 10%. In some embodiments, the haze is at least 15%, at least 20%, at least 30%, or even at least 40%. Clarity, while it is a different parameter than haze, it is not independent from haze. For example, a construction that has a relatively high haze value will have a clarity value that is impacted by the relatively high haze. Generally it is desirable that the glazing constructions have a clarity value in the range of 10-99%. Transmission, haze and clarity will be discussed further below and methods for measuring them are described in the Examples section.

In one embodiment of this disclosure, the hybrid construction comprises a glazing substrate, a visible light diffusing layer disposed on the first glazing substrate, and a light redirecting layer adjacent to the visible light diffusing layer. The visible light diffusing layer and light redirecting layer are oriented such that incoming solar light contacts the visible light diffusing layer before contacting the light redirecting layer. There are certain advantages to this orientation of elements. For example, having the incoming sunlight contact the diffusing layer cause scattered light to contact the light redirecting layer to provide the desirable feature described above of reducing the glare and color formation of the redirected light. An additional desirable feature achieved with this orientation of elements is that the scattering of all incoming light that contacts the diffusing layer reduces the glare even of light that does not contact the light redirecting layer. Incoming light that does not contact the light redirecting layer can cause normal glare. The incoming light may not contact the light redirecting layer either because it is an incoming angle that does not permit it to be redirected, or because the incoming light is contacting a portion of the window that does not contain the redirecting layer (it may be desirable to have the light redirecting layer on only a portion of a window and the light redirecting layer may be in a pattern, i.e. not a continuous layer). The light diffusing layer and the light redirecting layer may be laminated together to form a composite multilayer construction or the layers may be separate articles. Additional layers may also be present in the hybrid construction.

In other embodiments of this disclosure, the hybrid construction comprises a first glazing substrate, a patterned visible light diffusing layer, and a light redirecting layer adjacent to the visible light diffusing layer. The patterned visible light diffusing layer and light redirecting layer adjacent to the visible light diffusing layer may comprise a multilayer light redirecting film, or they may be separate layers. The light diffusing layer and the light redirecting layer may be any orientation to the glazing substrate. The use of a patterned visible light diffusing layer provides the advantageous properties described above, coupled with the need to use fewer diffusive elements. This not only can assist in making the manufacturing less expensive, it can be aesthetically more appealing to have less of the window surface diffusive to visible light. For example, with a home or office window, a viewer that looks through a visible light diffusing element will generally have a hazy view instead of the desired bright exterior view.

In still other embodiments of this disclosure, the hybrid construction comprises at least two glazing substrates with the diffusive layer and light redirecting layer each disposed on one of the glazing substrates. In these embodiments, regardless of the relative orientation of the diffusive layer and the light redirecting layer, an intervening space is present between the diffusive layer and the light redirecting layer. This intervening space can be a vacuum, as is common in some glazing constructions, or the space may contain air or other gas such as nitrogen or argon, for example.

Therefore, it is possible with the hybrid constructions of this disclosure to prepare glazing articles that are able to increase the amount of lighting within a room by redirecting sunlight towards the ceiling without the undesirable features of increased glare or splitting of the sunlight into its component colors. The hybrid constructions can be used, for example at window manufacturers or can be retrofitted to existing windows. Additionally, embodiments of the hybrid constructions of this disclosure are suitable for use with single pane windows, double pane windows and even windows with more than two panes.

The term "adjacent" as used herein, when referring to two layers, means that the two layers are in proximity with one another with no intervening open space between them. They may be in direct contact with one another (e.g. laminated together) or there may be intervening layers. Examples of two layers disposed on a substrate where layer 1 and layer 2 are adjacent include the configurations: substrate/layer 1/layer 2; and layer 1/substrate/layer 2.

The term "optical substrate" as used herein refers to substrates that are at least optically transparent, may be optically clear and may also produce additional optical effects. Examples of optical substrates include optical films and glazing substrates, such as glass plates.

The term "light diffusing" as used herein regarding substrates, such as glazing substrates, and films, such as optical films, refers to substrates or films that are designed to diffuse light. This light diffusion may be effected, for example, through the use of a textured surface of a substrate, or through other means such as incorporation of light diffusing particles within the matrix of a film. While it is noted that all optical articles can be considered to diffuse light to some extent, substrates and films that are optically transparent or optically clear are not considered to be "light diffusing" unless some light diffusing property is imparted to these substrates or films.

The term "optical film" as used herein refers to films that are at least optically transparent, may be optically clear and may also produce additional optical effects. Examples of additional optical effects include, for example, light diffusion, light polarization or reflection of certain wavelengths of light.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures.

The terms "point", "side", and "intersection" as used herein, have their typical geometric meanings.

The term "aspect ratio" as used herein when referring to a structure attached to a substrate, refers to the ratio of the greatest height of the structure above the substrate to the base of the structure that is attached to, or part of, the substrate.

The term "adhesive" as used herein refers to polymeric compositions useful to adhere together two adherends. Examples of adhesives are curable adhesives, heat activated adhesives, and pressure sensitive adhesives.

Curable adhesives are adhesives that contain a curable reaction mixture which cures to form an adhesive bond. Unlike heat activated adhesives (removable upon the application of heat) and pressure sensitive adhesives, curable adhesives are generally not removable after curing and are intended to form a permanent bond between two adherends.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "microstructure" means the configuration of features wherein at least 2 dimensions of the features are microscopic. The topical and/or cross-sectional view of the features must be microscopic.

As used herein, the term "microscopic" refers to features of small enough dimension so as to require an optic aid to the naked eye when viewed from any plane of view to determine its shape. One criterion is found in *Modern Optic Engineering* by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object.

In one embodiment of this disclosure, the hybrid construction comprises a first glazing substrate, a visible light diffusing layer disposed on the first glazing substrate, and a light redirecting layer adjacent to the visible light diffusing layer. The visible light diffusing layer and light redirecting layer are oriented such that incoming solar light contacts the visible light diffusing layer before contacting the light redirecting layer.

There are certain advantages to this orientation of elements. For example, having the incoming sunlight contact the diffusing layer cause scattered light to contact the light redirecting layer to provide the desirable feature described above of reducing the glare and color formation of the redirected light. An additional desirable feature achieved with this orientation of elements is that the scattering of all incoming light that contacts the diffusing layer reduces the glare even of light that does not contact the light redirecting layer. Incoming light that does not contact the light redirecting layer can cause normal glare. The incoming light may not contact the light redirecting layer either because it is an incoming angle that does not permit it to be redirected, or because the incoming light is contacting a portion of the window that does not contain the redirecting layer (it may be desirable to have the light redirecting layer on only a portion of a window and the light redirecting layer may be in a pattern, i.e. not a continuous layer). The light diffusing layer and the light redirecting layer may be laminated together to form a composite multilayer construction or the layers may be separate articles. Additional layers may also be present in the hybrid construction.

Examples of suitable additional layers that can be used include, for example, low emissivity (Low-e) layers, infrared light rejecting layers, and color or tinting layers. Examples of Low-e layers are Low-e coatings which reflect mid to far infrared energy. There are two general types of Low-e coatings: pyrolytic Low-e coatings, commonly referred to as "hard coats" are applied during the manufacture of glass; Low-e coating applied in a vacuum process, commonly referred to as "soft coats" are applied after the glass plate is manufactured. Low-e coatings, if used on, for example, glazing substrates, are generally not present on glazing surfaces to which additional coatings or layers are disposed. For example, if the glazing substrate has a Low-e coating, the visible light diffusing layer and/or light redirecting layer are not attached to the Low-e coated surface.

Examples of infrared light rejecting layers include a wide range of possible layers. Infrared light may be rejected by reflection of the infrared light, by absorption of the infrared light, or by a combination thereof. A variety of multi-layer films have been developed to reflect infrared light while allowing the transmission of visible light. Examples of such multi-layer films include Fabry-Perot interference filters such as described in U.S. Pat. Nos. 4,799,745 and 6,007,901. Other examples are multi-layer polymeric optical films that have been described in, for example, U.S. Pat. No. 3,610,724 (Rogers); U.S. Pat. No. 3,711,176 (Alfrey, Jr. et al.), U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.); U.S. Pat. No. 6,045,894 (Jonza et al.); U.S. Pat. No. 6,531,230 (Weber et al.); PCT Publication WO 99/39224 (Ouderkirk et al.); and US Patent Publications 2001/0022982 (Neavin et al.); and 2006/0154049 (Padiyath et al.). In such polymeric multi-layer optical films, polymer materials are used predominantly or exclusively in the makeup of the individual layers. Such films can be compatible with high volume manufacturing processes, and may be made in large sheets and roll goods.

Infrared light may also be rejected by the use of an infrared absorbing layer instead of, or in conjunction with, an infrared light reflecting layer. An example of such an infrared light absorbing layer is a layer comprising infrared absorbing nanoparticles dispersed within a cured polymeric binder. In some embodiments, this infrared light absorbing layer has a thickness in a range from 1 to 20 micrometers, or from 1 to 10 micrometers, or from 1 to 5 micrometers. This infrared light absorbing layer can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. The polymeric binder layer includes infrared radiation absorbing nanoparticles dispersed through the polymeric binder layer. The infrared radiation absorbing nanoparticles may include any material that preferentially absorbs infrared radiation. Examples of suitable materials include metal oxides such as tin, antimony, indium and zinc oxides and doped oxides. In some instances, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include antimony oxide (ATO) and/or indium tin oxide (ITO). In some cases, the infrared radiation absorbing nanoparticles may include or be made of lanthanum hexaboride, or $LaB_6$.

Optional additional layers may also include color or tinting layers. These may be applied to the glazing substrate or to other layers. These layers may be film layers or coatings.

As stated above, it may be desirable for the light diffusing layer and/or the light redirecting layer to cover only a portion of the first glazing substrate. The first glazing substrate has a first major surface and a second major surface. Each of these surfaces has a surface area value. It may be desirable, therefore, for the light diffusing layer and/or the light redirecting layer to cover only a portion of the surface area value of the surface to which it is adhered.

A wide variety of glazing substrates are suitable in the glazing units of this disclosure. In some embodiments, a single glazing substrate is present, in other embodiments multiple glazing substrates are present. In some embodiments the light diffusing and light redirecting hybrid construction is attached to an exterior surface of a glazing substrate, and in other embodiments, the hybrid construction is located between two glazing substrates.

Suitable glazing substrates are at least optically transparent, and may be optically clear. Examples of suitable substrates include, for example, windows. Windows may be made of a variety or different types of glazing substrates such as a variety of glasses or from polymeric materials such as polycarbonate or polymethyl methacrylate. In some embodiments, the window may also comprise additional layers or treatments. Examples of additional layers include, for example, additional layers of film designed to provide tinting, shatter resistance and the like. Examples of additional treatments that may be present of windows include, for example, coatings or various types such as hardcoats, and etchings such as decorative etchings.

In some embodiments, the glazing substrate is a single pane substrate and the light diffusing and light redirecting hybrid construction is attached to an exterior surface of the single pane glazing substrate. As long as the orientation is maintained in which incoming solar light contacts the light diffusing layer before encountering the light redirecting layer, a wide variety of configurations of layers are suitable. For example, the light diffusing layer may be disposed on the interior surface of the glazing substrate, by which is meant the side that faces the inside of the building. The light redirecting layer may be attached directly to the diffusing layer, or there may be additional optional layers intervening as long as these layers do not interfere with the function of the light redirecting layer. In other embodiments, the diffusing layer, light redirecting layer, and any optional layers can be applied to the exterior surface of the glazing substrate, by which it is meant the side that faces the outside environment. In still other embodiments, the diffusing layer may be disposed on the exterior surface of the glazing substrate and the light redirecting layer may be disposed on the interior surface of the glazing substrate. In these embodiments, the glazing substrate is between the diffusing layer and the light redirecting layer.

In some embodiments, more than one glazing substrate is present. A wide range of different configurations are possible that include more than one glazing substrate. For example, the glazing substrate may be treated like a single pane substrate since the two glazing substrates are adhered together to essentially form a thicker glazing substrate. Often the two panes or glazing are held together with an adhesive such as polyvinyl butyral, and may have a layer of film between the two panes to provide shatter resistance (an example of this type of glazing is safety glass such as used in automobile windshields). In these multiple glazing substrates, the configurations of light diffusing layer, light redirecting layer, and optional additional layers is the same as described above.

In other double pane glazings, the two panes of glazing are parallel to each other and are separated by a space. In some insulated windows, the space is evacuated to provide a "dead space" between the two panes of glazing. In glazings of this type, the light diffusing layer and the light redirecting layer are configured on the same glazing substrate in the configurations described above for a single glazing substrate.

The hybrid construction also comprises a visible light diffusing layer disposed on the first glazing substrate. A wide variety of light diffusing layers are suitable. In some embodiments, the light diffusing layer comprises a light diffusing film or coating that is attached to the first glazing substrate. In other embodiments, the light diffusing layer comprises a textured surface or topography capable of scattering light, present on the surface of the first glazing substrate. In still other embodiments, the light diffusing layer comprises a light diffusing substrate, such as a glazing substrate, that comprises a textured surface or topography capable of scattering light, present on the surface of the light diffusing substrate or may contain light diffusing particles either within the substrate matrix, or present as a surface coating within a cured binder matrix. In these embodiments, the light diffusing substrate is separate from the first glazing substrate.

In many embodiments, the light diffusing layer includes a light diffusing film or coating that is capable of providing bulk diffusion of visible light. These light diffusing films or coatings may also comprise additional functionality besides the diffusion of light. For example, the coatings may be hard coats to provide resistance to scratching, marring or soiling or they may have adhesive properties. The films may provide light control properties such as infrared light reflection or physical properties such as shatter resistance.

Typically, these films or coatings comprise light scattering particles dispersed within a cured binder matrix. The light scattering particles and the binder have different refractive indices. In many embodiments, the light scattering particles have a first refractive index and the binder has a second refractive index and the second refractive index is at least a value of 0.05 different than the first refractive index. In some embodiments, the light scattering particles have a first refractive index and the binder has a second refractive index and the second refractive index is at least a value of 0.1 different than the first refractive index. The light diffusing layer provides the hybrid construction with a haze value of at least 10% or greater or at least 30% or greater, or at least 50% or greater. Another property that can be used to measure the optical properties of the light diffusing layer is clarity. Typically, clarity is in the range of 10-99%. Clarity is also a measure of the scattering of light and therefore layers that have a relatively high haze are also going to have their clarity affected. Haze and clarity are measured according to ASTM D 1003-00. In some embodiments, the light diffusing layer provides the hybrid construction with a haze value range from 10% to 95%, or from 20% to 75%. The particles can be formed of any useful light scattering material and can have any useful size and loading within the binder. In many embodiments, the particles have an approximate diameter in a range from 1 to 25 micrometers and a refractive index in a range from 1.5 to 1.6. Illustrative light diffusing layers are described in U.S. Pat. No. 6,163,402 (Chou et al.), and PCT Publication WO 2005/005162 (Hayashi et al.) which described illustrative printed light diffusing layers.

Examples of suitable diffusive films include members of the FASARA line of films commercially available from 3M Company, St. Paul, Minn. The optical properties (Transmittance, Haze and Clarity) of some of these films and the films on a glass plate are shown in Table A below. The optical properties were measured using a "HAZE-GARD PLUS" (BYK-Gardner, Columbia, Md.) according to test method ASTM D1003. In Table A, "Film Only" means just the FASARA film was measured, the other measurements were made of laminates of the FASARA film on a glass plate.

TABLE A

| Sample FASARA Film | Film Only | | | Film on 3 mm thick glass with film side towards light | | |
|---|---|---|---|---|---|---|
| | Trans (%) | Haze (%) | Clarity (%) | Trans (%) | Haze (%) | Clarity (%) |
| SAN MARINO | 68 | 100 | 15 | 56 | 100 | 18 |
| LAUSANNE | 92 | 42 | 54 | 88 | 40 | 54 |
| MAT CRYSTAL i | 93 | 57 | 20 | 89 | 56 | 19 |
| MILANO | 77 | 93 | 30 | 70 | 90 | 31 |
| FINE CRYSTAL | 93 | 42 | 33 | 90 | 41 | 33 |

In some embodiments, the light diffusing layer binder is a cured polymeric material that can function as a hardcoat. Suitable polymeric binders include the thermal and/or UV-polymerized (i.e., cured) products of acrylate and/or methacrylate monomers. A suitable cured binder is the thermal and/or UV-polymerized product of a brominated, alkyl-substituted phenyl acrylate or methacrylate (e.g., 4,6-di-bromo-2-sec-butyl phenyl acrylate), a methyl styrene monomer, a brominated epoxy diacrylate, 2-phenoxyethyl acrylate, and a hexa-functional aromatic urethane acrylate oligomer, as described in U.S. Pat. No. 6,355,754. While most types of energy polymerizable telechelic monomers and oligomers are useful for forming these polymeric binders, acrylates are preferred because of their high reactivity. The curable binder composition should be of flowable viscosity that is low enough that air bubbles do not become entrapped in the composition. Reactive diluents can be mono- or di-functional monomers such as, for example, SR-339, SR-256, SR-379, SR-395, SR-440, SR-506, CD-611, SR-212, SR-230, SR-238, and SR-247 available from Sartomer Co., Exton, Pa. Typical useful oligomers and oligomeric blends include CN-120, CN-104, CN-115, CN-116, CN-117, CN-118, CN-119, CN-970A60, CN-972, CN-973A80, CN-975 available from Sartomer Co., Exton, Pa. and Ebecryl 1608, 3200, 3201, 3302, 3605, 3700, 3701, 608, RDX-51027, 220, 9220, 4827, 4849, 6602, 6700-20T available from Surface Specialties, Smyrna, Ga. Additionally, a multifunctional crosslinker can assist in providing a durable, high crosslink density composite matrix. Examples of multifunctional monomers include SR-295, SR-444, SR-351, SR-399, SR-355, and SR-368 available from Sartomer Co., Exton, Pa. and PETA-K, PETIA and TMPTA-N available from Surface Specialties, Smyrna, Ga. Multifunctional monomers can be used as crosslinking agents to increase the glass transition temperature of the binder polymer that results from the polymerizing of the polymerizable composition. The light diffusing layer binder can form a hard resin or hardcoat. The term "hard resin" or "hardcoat" means that the resulting cured polymer exhibits an elongation at break of less than 50 or 40 or 30 or 20 or 10 or 5 percent when evaluated according to the ASTM D-882-91 procedure. In some embodiments, the hard resin polymer can exhibit a tensile modulus of greater than 100 kpsi ($6.89 \times 10^8$ Pascals) when evaluated according to the ASTM D-882-91 procedure. In some embodiments, the hard resin polymer can exhibit a haze value of less than 10% or less than 5% when tested in a Taber abrader according to ASTM D 1044-99 under a load of 500 g and 50 cycles (haze can be measured with Haze-Gard Plus, BYK-Gardner, Md., haze meter).

In some embodiments, the light diffusing layer binder is a cured polymeric material that can function as an adhesive. These adhesive layers can provide adhesion to bind together other layers while also providing diffusion of light. These adhesive layers can be curable layers or they can be pressure sensitive adhesive or heat activated adhesive layers. Examples of pressure sensitive adhesive layers with light diffusion properties include those described in PCT Publication Nos. WO 97/01610 (Goetz et al.) and WO 2010/033571 (Sherman et al.) and US Patent Publication No. US 2010/0297406 (Schaffer et al.).

In some embodiments, the light diffusing layer is a light diffusing surface on the first glazing substrate. The light diffusing surface may comprise a textured surface or topography that is capable of scattering light (i.e., surface light diffusion) as light transmits through the light diffusing surface. The textured surface or topography can be formed using any useful technique. In some embodiments, the textured surface is formed via embossing or erosion (e.g., sandblasting). In other embodiments, the textured surface is formed via casting onto a textured master surface. The textured surface can be defined by a plurality of peaks and valleys that are randomly or non-randomly placed or formed along a surface. These peaks and valleys are effective to disperse or diffuse light that transmits through the light diffusing surface. The light diffusing surface provides the hybrid construction with a haze value of at least 10% or greater or at least 30% or greater, or at least 50% or greater. Haze is measured according to ASTM D 1003-00. In some embodiments, the light diffusing surface provides the hybrid construction with a haze value range from 10% to 95%, or from 20% to 75%.

In some embodiments, the light diffusing layer comprises a light diffusing substrate, such as a glazing substrate. The light diffusing substrate may comprise a textured surface or topography capable of scattering light, present on the surface of the light diffusing substrate. In some embodiments, the light diffusing substrate may comprise light diffusing particles within the substrate matrix. Examples of light diffusing substrates that comprise light diffusing particles with the substrate matrix include polycarbonate or polymethyl methacrylate substrates prepared with light diffusing particles incorporated into the polycarbonate or polymethyl methacrylate or applied as a coating to the substrate.

In embodiments where the light diffusing layer is a film, it may be adhered to the first glazing substrate in a variety of ways, such as by heat lamination or through the use of an adhesive layer. Heat lamination involves applying the light diffusing film to the glazing substrate and applying heat and pressure to adhere the film to the glazing substrate surface. In many embodiments, it may be desirable to use an adhesive layer to adhere the light diffusing layer to the first glazing substrate.

Examples of adhesives suitable for use as the adhesive layer include, for example, heat activated adhesives, pressure sensitive adhesives or curable adhesives. Examples of suitable optically clear curable adhesives include those described in U.S. Pat. No. 6,887,917 (Yang et al.). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the substrate. Typically, a pressure sensitive adhesive is used.

A wide variety of pressure sensitive adhesive compositions are suitable. In some embodiments, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methylbutyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the adhesive if desired by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

In addition to being optically clear, the pressure sensitive adhesive may have additional features that make it suitable for lamination to large substrates such as windows. Among these additional features is temporary removability. Temporarily removable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). Alternatively, or in addition, to being temporarily removable, the pressure sensitive adhesive layer may contain a microstructured surface. This microstructured surface permits air egress as the adhesive is laminated to a substrate. For optical applications, typically, the adhesive will wet out the surface of the substrate and flow to a sufficient extent that the microstructures disappear over time and therefore do not affect the optical properties of the adhesive layer. A microstructured adhesive surface may be obtained by contacting the adhesive surface to a microstructuring tool, such as a release liner with a microstructured surface.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive. In some embodiments, the pressure sensitive adhesive may contain a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The hybrid construction also comprises a light redirecting layer adjacent to the visible light diffusing layer. As described above, the light redirecting layer, depending upon the configuration of the glazing article, may be adhered to visible light diffusing layer, to the first glazing substrate, or to some other optional layer intermediate between the visible light diffusing layer, or the first glazing substrate and the light redirecting layer. The light redirecting layer may be adhered to any of these layers by, for example an adhesive layer, such as the adhesive layers described above.

The light redirecting layer surface comprises an optical substrate with a microstructured surface. This microstructured surface comprises an ordered arrangement of a plurality of prism structures. The ordered arrangement of prism structures can form an array of microstructures. The array can have a variety of elements. For example, the array can be linear (i.e. a series of parallel lines), sinusoidal (i.e. a series of wavy lines), random, or combinations thereof. While a wide variety of arrays are possible, it is desirable that the array elements are discrete, i.e., that the array elements do not intersect or overlap. In some embodiments, the prisms are symmetrical and in other embodiments the prisms are asymmetrical multi-sided refractive prisms.

Suitable symmetrical prism structures are described in US Patent Publication No. 2008/0291541 (Padiyath et al.). In some embodiments, a filling layer is disposed within cavities formed between adjacent prism structures. In these embodiments, the filling layer has a refractive index value that is different than a refractive index value of the prism structures. This difference can be a value of 0.05 or greater or 0.1 or greater. The filling layer can be formed of any useful visible light transmitting material such as, for example, a polymer material.

In some embodiments, the filling layer is capable of being cleanly removed from the plurality of prism structures. For example, the hybrid construction can be applied onto a glazing substrate and then the filling layer can be removed to expose the prism structures. Thus, the filling layer protects the prism structures until the hybrid construction is applied and then can be removed, if desired. The term "cleanly" removed refers to leaving substantially no filling layer residue on the prism structures and also leaving substantially no prism structure residue on the filling layer. In some embodiments, the filling layer is used as a structure template to aid in forming the prism structures.

The prism structures and/or filling layer can be formed of any useful polymerizable composition. In many embodiments, the prism structures and/or filling layer are formed from different polymerizable compositions. In some embodiments, the polymerizable composition is formed of monomers including mono-, di-, or higher functional monomers, and/or oligomers, and in some embodiments, those having a high index of refraction, for example, greater than about 1.4 or greater than about 1.5. The monomers and/or oligomers may be polymerizable using UV radiation. Suitable materials include (meth)acrylates, halogenated derivatives, telechelic derivatives, and the like, for example, those described in U.S. Pat. Nos. 4,568,445; 4,721,377; 4,812,032; 5,424,339; and 6,355,754. In some embodiments, the polymerizable compositions include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(methyl) acrylates such as polymethylmethacrylate; polyurethanes; polyvinyl chloride; polycyclo-olefins; polyimides; glass; or combinations or blends thereof. The polymerizable compositions may also include a naphthalate-containing multilayered optical film as described in U.S. Pat. No. 6,111,696.

In some embodiments, the prism structures polymerizable composition is described in U.S. Patent Publication No., 2005/0147838. This polymerizable composition includes a first monomer comprising a major portion of 2-propenoic acid, (1-methylethylidene)bis-(2,6-dibromo-4,1-phenylene) oxy(2-hydroxy-3,1-propanediyl)) ester; pentaerythritol tri (meth)acrylate; and phenoxyethyl (meth)acrylate.

In some embodiments, the prism structures are linear prism structures, or pyramidal prism structures. In some embodiments, the prism structures are linear prism structures or non-linear or broken linear prism structures. The prism structures redirect at least a portion of the visible light incident upon the light redirecting layer. In many embodiments, at least 50% of visible light incident upon the light redirecting layer is redirected by the light redirecting layer. In many embodiments, the plurality of prism structures cooperates to direct at least a portion of incident light in substantially the same direction or directions. This light redirecting effect is due to refraction at the prism surface interface.

The symmetrical prism structures may be regular sharp tip prism structures, or they may have other useful configurations such as, for example, shape tip, rounded tip, and/or truncated tip, as desired. The prism structures can have a varying height, spatially varying pitch, or spatially varying facet angle, as desired. In some embodiments, the prism structures have a pitch and height in a range from 50 to 2000 micrometers, or from 50 to 1000 micrometers.

In some embodiments, the microstructured surface comprises an ordered arrangement of a plurality of asymmetrical multi-sided refractive prisms. Suitable asymmetrical multi-sided prism structures are described in pending U.S. Patent Applications: Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.). It can be desirable that the prisms be asymmetrical such that incoming incident solar light (which comes from above and is incident upon the film at an angle of from 15-80° from the direction perpendicular to the substrate) is redirected upwards towards the ceiling of the room, but incoming light from below is not redirected downwards. An artifact of symmetrical structures is that the downward directed light could be visible to the observer, which is undesirable.

The plurality of asymmetrical multi-sided refractive prisms is designed to effectively redirect incoming solar light towards the ceiling of a room which contains a window or other aperture containing the light directing film. Typically, the asymmetrical multi-sided refractive prisms comprise 3 or greater sides, more typically 4 or greater sides. The prisms may be viewed as an orderly array of protrusions arising from the surface of the optical film. Typically, the aspect ratio of these protrusions is 1 or greater, that is to say that the height of the protrusion is at least as great as the width of the protrusion at the base. In some embodiments, the height of the protrusions is at least 50 micrometers. In some embodiments, the height of the protrusions is no more than 250 micrometers. This means that the asymmetrical structures typically protrude from 50 micrometers to 250 micrometers from the first major surface of the optical substrate.

Figure 1:
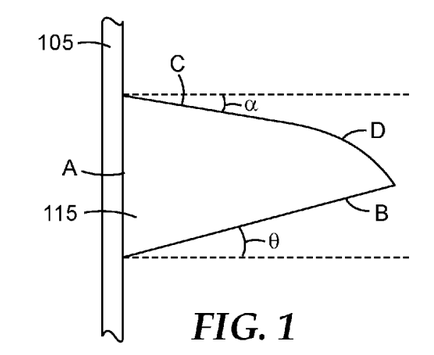
FIG. 1 shows a cross-sectional view of a light redirecting prism structure construction of some embodiments of this disclosure.
Figure 2:
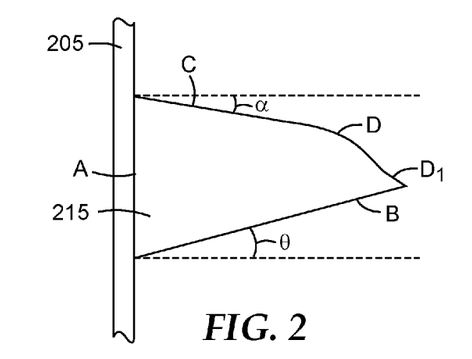
FIG. 2 shows a cross-sectional view of a light redirecting prism structure construction of some embodiments of this disclosure.
Figure 3:
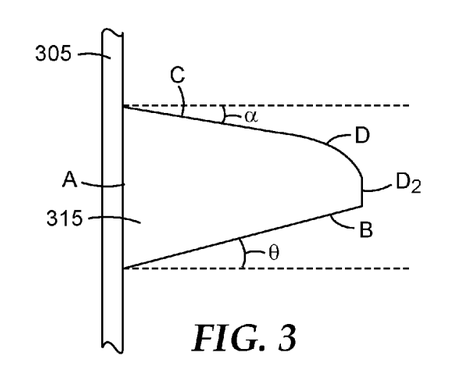
FIG. 3 shows a cross-sectional view of a light redirecting prism structure construction of some embodiments of this disclosure.

Exemplary asymmetrical light redirecting prism structure constructions are shown in FIGS. 1-3. FIG. 1 shows light redirecting prism structure construction 100 which contains optical substrate 105 and the cross section of a single prism 115. Prism 115 has 4 sides, side A which is adjacent to optical substrate 105, side B which is joined to side A, side C which is joined to side A, and side D which is joined to side B and side C.

Side B is angled in such a way that it produces total internal reflection to solar light rays incident upon the second major surface of the optical substrate. Solar light rays are incident from above the second major surface of the optical substrate and typically form an angle of from about 15-80° from perpendicular to the first major surface of the optical substrate depending upon the time of day, time of year, geographical location of the light redirecting construction, etc. The incident light rays enter the prism 115 and are reflected from side B by the phenomenon of total internal reflection. To achieve total internal reflection, it is desirable that side B not be perpendicular to side A, but be offset from perpendicular by angle θ as shown in FIG. 1. The selection of the value for angle θ will depend upon a variety of variable features including, for example, the refractive index of the composition materials used to prepared the light management film, the proposed geographic location of use for the light management film, etc but typically the value for angle θ is in the range 6-14° or even 6-12°.

Side C is joined to side A and connects side A to side D. It is desirable that side A not be perpendicular to side A, but be offset from perpendicular by angle α. The offset of angle α, among other features, aids in preventing light which exits prism 115 through side D from entering an adjacent prism (not shown in FIG. 1). As with angle θ, the selection of the value for angle α depends upon a variety of variable features, including the closeness of adjacent prisms, the nature and size of side D, etc. Typically, angle α is in the range 5-25° or even 9-25°.

Side D is the side of the prism from which the redirected light rays exit the prism. In FIG. 1 side D is shown as a single side but side D may comprise a series of sides. Also, in FIG. 1 side D is shown as a curved side, but side D need not be curved in all embodiments. Light rays that are reflected from side B are redirected by side D to a direction useful for improving the indirect lighting of a room. By this it is meant that the light rays reflected from side D are redirected either perpendicular to side A or at an angle away from perpendicular and towards the ceiling of the room.

In some embodiments, side C may be curved, side D may be curved, or the combination of sides C and D may form a single continuously curved side. In other embodiments, side C or D or C and D taken together comprises a series of sides, wherein the series of sides comprises a structured surface. The structured surface may be regular or irregular, i.e., the structures may form regular patterns or random patterns and may be uniform or the structures may be different. These structures, since they are substructures on a microstructure, are typically very small. Typically, each dimension of these structures (height, width and length) is smaller than the dimension of side A.

FIG. 2 shows another embodiment of a light redirecting prism structure construction. In FIG. 2, light directing construction 200 contains optical substrate 205 and the cross section of a single prism 215. Prism 215 has 4 sides, side A which is adjacent to optical substrate 205, side B which is joined to side A, side C which is joined to side A, and side D which is joined to side B and side C. Side D comprises sub-side D1. Sub-side D1 is joined to side B by a point. This point provides a point of contact with a glazing substrate or an optional cover film (the glazing substrate or optional cover film are not shown in FIG. 2). The angles θ and a are as defined in FIG. 1.

FIG. 3 shows another embodiment of a light redirecting prism structure construction. In FIG. 3, light directing construction 300 contains optical substrate 305 and the cross section of a single prism 315. Prism 315 has 4 sides, side A which is adjacent to film 305, side B which is joined to side A, side C which is joined to side A, and side D which is joined to side B and side C. Side D comprises sub-side D2. Sub-side D2 is joined to side B and is designed to form a bonding zone with a glazing substrate or cover film (the glazing substrate or cover film is not shown in FIG. 3). The angles θ and a are as defined in FIG. 1.

The entire surface of the light redirecting layer may contain microstructures, or the microstructures may be present on only a portion of a first surface of the light redirecting layer. This is particularly true in instances when the hybrid construction is attached to a glazing article that is incorporated into a glazing article in, for example, a window. It may not be necessary or desirable for the entire surface of the glazing substrate to contain a microstructured surface in order to produce the desirable light redirection effect.

The visible light diffusing layer and the light redirecting layer are adjacent to each other. In some embodiments, the visible light diffusing layer and the light redirecting layer are adhered to one another to form a composite light redirecting construction. A wide variety of such composite constructions are possible. For example, in some embodiments, a light diffusing layer may be incorporated into the surface of the first glazing substrate with a light redirecting film adhered to this surface. In other embodiments, the visible light diffusing layer and the light redirecting layer may both be polymeric films that are laminated to each other and adhered to the first glazing substrate. The composite constructions may be adhered to each other and to the first glazing substrate through the use of an adhesive layer, such as those described above.

Figure 4:
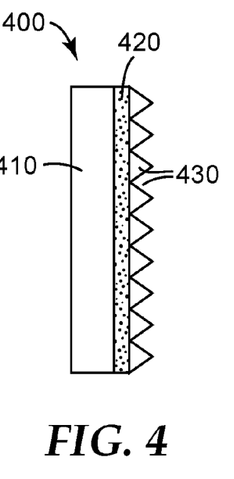
FIG. 4 shows a cross-sectional view of a hybrid light redirecting and light diffusing construction of this disclosure.
Figure 5:
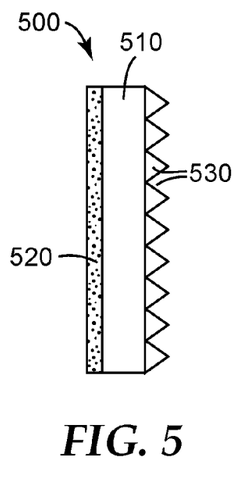
FIG. 5 shows a cross-sectional view of a hybrid light redirecting and light diffusing construction of this disclosure.
Figure 6:
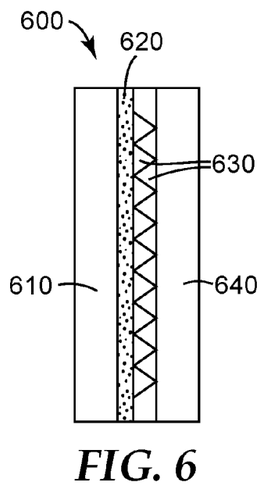
FIG. 6 shows a cross-sectional view of a hybrid light redirecting and light diffusing construction of this disclosure.

Some specific embodiments of hybrid constructions comprising a first glazing substrate, a visible light diffusing layer disposed on the first glazing substrate, and a light redirecting layer adjacent to the visible light diffusing layer, where the visible light diffusing layer and light redirecting layer are oriented such that incoming solar light contacts the visible light diffusing layer before contacting the light redirecting layer are illustrated in FIGS. 4-6.

In FIG. 4, hybrid construction 400 comprises first glazing substrate 410, visible light diffusing layer 420 disposed on first glazing substrate 410, and light redirecting layer 430. This construction is configured such that incoming solar light contacts first glazing substrate 410 first, passes through consecutively first glazing substrate 410 and visible light diffusing layer 420 before contacting light redirecting layer 430 and being directed upwards. Visible light diffusing layer 420 and light redirecting layer 430 can be separate layers or can be a composite light diffusing and redirecting construction, such as a film. In some embodiments, layers of optically clear adhesive can be used to adhere visible light diffusing layer 420 to first glazing substrate 410 (not shown) and/or to adhere light redirecting layer 430 to visible light diffusing layer 420 (not shown). As described above, visible light diffusing layer 420 may be a film or coating, a textured surface or topography on first glazing substrate 410, or a visible light diffusing substrate.

In FIG. 5, hybrid construction 500 comprises first glazing substrate 510, visible light diffusing layer 520 disposed on first glazing substrate 510, and light redirecting layer 530. This construction is configured such that incoming solar light contacts visible light diffusing layer 520 first, passes through consecutively visible light diffusing layer 520 and first glazing substrate 510 before contacting light redirecting layer 530 and being directed upwards. In some embodiments, layers of optically clear adhesive can be used to adhere visible light diffusing layer 520 to first glazing substrate 510 (not shown) and/or to adhere light redirecting layer 530 to first glazing substrate 510 (not shown). As described above, visible light diffusing layer 520 may be a film or coating, a textured surface or topography on first glazing substrate 510, or a visible light diffusing substrate.

In FIG. 6, hybrid construction 600 comprises first glazing substrate 610, visible light diffusing layer 620 disposed on first glazing substrate 610, light redirecting layer 630, and second glazing substrate 640. This construction is configured such that incoming solar light contacts first glazing substrate 610 first, passes through consecutively first glazing substrate 610 and visible light diffusing layer 620 before contacting light redirecting layer 630 and being directed upwards. Visible light diffusing layer 620 and light redirecting layer 630 can be separate layers or can be a composite light diffusing and redirecting construction, such as a film. In some embodiments, layers of optically clear adhesive can be used to adhere visible light diffusing layer 620 to first glazing substrate 610 (not shown) and/or to adhere light redirecting layer 630 to visible light diffusing layer 620 and/or second glazing substrate 640 (not shown). As described above, visible light diffusing layer 620 may be a film or coating, a textured surface or topography on first glazing substrate 610, or a visible light diffusing substrate. In some embodiments, a void space (not shown) may be present between light redirecting layer 630 and second glazing substrate 640. This void space may be a vacuum space or may be filled with, for example air or other gas.

In other embodiments of this disclosure, the hybrid construction comprises a first glazing substrate, a patterned visible light diffusing layer, and a light redirecting layer adjacent to the visible light diffusing layer. The patterned visible light diffusing layer and light redirecting layer adjacent to the visible light diffusing layer may comprise a composite light redirection construction such as a film, or they may be separate layers. The light diffusing layer and the light redirecting layer may be in any orientation to the glazing substrate. The use of a patterned visible light diffusing layer provides the advantageous properties described above, coupled with the need to use fewer diffusive elements. This not only can assist in making the manufacturing less expensive, it can be aesthetically more appealing to have less of the window surface diffusive to visible light. For example, with a home or office window a viewer that looks through a visible light diffusing element will generally have a hazy view instead of the desired bright exterior view.

In some embodiments, the patterned visible light diffusing layer is disposed on the first glazing substrate. A wide variety of patterned light diffusing layers are suitable. In some embodiments, the patterned light diffusing layer comprises a patterned light diffusing film or coating that is attached to the first glazing substrate. In other embodiments, the patterned light diffusing layer comprises a textured surface or topography capable of scattering light, present on the surface of the first glazing substrate. In still other embodiments, the patterned light diffusing layer comprises a patterned light diffusing substrate, such as a glazing substrate, that comprises a textured surface or topography capable of scattering light, present on the surface of the light diffusing substrate or may contain a pattern of light diffusing particles either within the substrate matrix, or present as a surface coating within a cured binder matrix. In these embodiments, the light diffusing substrate is separate from the first glazing substrate.

The patterned visible light diffusing layer can be prepared by a variety of methods. In some embodiments, the patterned light diffusing layer comprises a patterned film or coating attached to the first glazing substrate, similar to the light diffusing films and coatings described above. However, the light diffusing elements of these films or coatings are patterned rather than continuous.

A film with a patterned light diffusing layer may be prepared by laminating an optically clear film with film segments in which the film segments contain light diffusing elements. Additionally, a light diffusing coating can be applied to an optically clear film and cured to generate a film with a patterned light diffusion layer. Another method involves printing a diffusing pattern onto a film as described in, for example, PCT Publication WO 2005/005162 (Hayashi et al.).

A coated visible light diffusing pattern can be generated by coating at least one surface of the first glazing substrate in a pattern with a light diffusing layer such as those described above.

A variety of patterned diffusive films are commercially available. Among these films are those available from 3M Company, St. Paul, Minn. under the trade designation FASARA, such as FASARA AURA 9, and FASARA LEISE.

In other embodiments, the patterned light diffusing layer comprises a textured surface or topography capable of scattering light, present on the surface of the first glazing substrate. Surface modification of the surface of the first glazing substrate may be carried out as described above, except that the modification produces a patterned surface layer instead of a continuous modified surface layer.

In some embodiments, the patterned light diffusing layer is disposed on the light redirecting layer instead of the first glazing substrate. In these embodiments the light diffusing layer can be a film or coating and is applied to the light redirecting layer using the techniques described above.

As mentioned above, in some embodiments, the patterned light diffusing layer and the light redirecting layer form a composite light redirection construction. Such a composite construction has been described above. In these embodiments, however, the composite construction can be in configurations such that incoming solar light contacts either the light diffusing layer or the light redirecting layer first.

Figure 7:
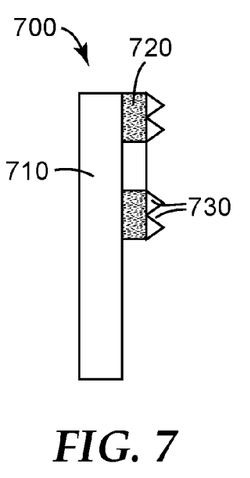
FIG. 7 shows a cross-sectional view of a patterned hybrid light redirecting and light diffusing construction of this disclosure.
Figure 8:
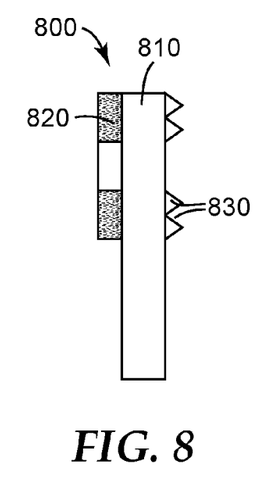
FIG. 8 shows a cross-sectional view of a patterned hybrid light redirecting and light diffusing construction of this disclosure.

Some specific embodiments of hybrid constructions comprising a first glazing substrate, a patterned visible light diffusing layer, and a light redirecting layer adjacent to the visible light diffusing layer are illustrated in FIGS. 7-8.

In FIG. 7, hybrid construction 700 comprises first glazing substrate 710, patterned visible light diffusing layer 720 disposed on first glazing substrate 710, and light redirecting layer 730. In FIG. 7 light redirecting layer 730 is also shown to be patterned, but such patterning is optional. This construction is configured such that incoming solar light may contact first glazing substrate 710 first, or it may contact light redirecting layer 730 first. Visible light diffusing layer 720 and light redirecting layer 730 can be separate layers or can be a composite light diffusing and redirecting construction, such as a film. In some embodiments, layers of optically clear adhesive can be used to adhere visible light diffusing layer 720 to first glazing substrate 710 (not shown) and/or to adhere light redirecting layer 730 to visible light diffusing layer 720 (not shown). As described above, patterned visible light diffusing layer 720 may be a film or coating, a textured surface or topography on first glazing substrate 410, or a patterned visible light diffusing substrate. Patterned light diffusing layer 720 may be a continuous layer as shown in FIG. 7, or the light diffusing elements may be discrete.

In FIG. 8, hybrid construction 800 comprises first glazing substrate 810, patterned visible light diffusing layer 820 disposed on first glazing substrate 810, and light redirecting layer 830. In FIG. 8 light redirecting layer 830 is also shown to be patterned, but such patterning is optional. This construction is configured such that incoming solar light may contact patterned light diffusing layer 820 first, or it may contact light redirecting layer 830 first. In some embodiments, layers of optically clear adhesive can be used to adhere visible light diffusing layer 820 to first glazing substrate 810 (not shown) and/or to adhere light redirecting layer 830 to first glazing substrate 810 (not shown). As described above, patterned visible light diffusing layer 820 may be a film or coating, a textured surface or topography on first glazing substrate 810, or a patterned visible light diffusing substrate. Patterned light diffusing layer 820 may be a continuous layer as shown in FIG. 8, or the light diffusing elements may be discrete.

Similarly to the above described embodiments, embodiments that comprise a patterned light diffusing layer and a light redirecting layer may comprise additional optional layers or substrates as described above, and can be adhered through the use of adhesive layers as described above. Additionally, the light redirecting layer may also be patterned. The pattern of the light redirecting layer may match the pattern of the light diffusing layer, or the pattern may be different.

The pattern of the light diffusing layer can be any suitable pattern. Examples of suitable patterns include diffusive stripes, regular geometric shapes, or irregular geometric shapes. The diffusive stripes, regular geometric shapes, or irregular geometric shapes may be in the form of straight lines, curvy lines, diagonal lines, discontinuous lines, circles, polygons, and the like. For ease of manufacture, straight lines are particularly useful.

In still other embodiments of this disclosure, the hybrid construction comprises at least two glazing substrates with the diffusive layer and light redirecting layer each disposed on one of the glazing substrates. In these embodiments, regardless of the relative orientation of the diffusive layer and the light redirecting layer, an intervening space is present between the diffusive layer and the light redirecting layer. This intervening space can be a vacuum, as is common in some glazing constructions or the space may contain air or other gas such as nitrogen or argon, for example.

Suitable light diffusing layers and light redirecting layers are described above. In these embodiments, a wide variety of configurations of the light diffusing layer and light redirecting layer are possible. For example, either the light diffusing layer or the light redirecting layer can be disposed on the first glazing substrate. The first glazing substrate is the one that is on the "outside" of the glazing article (i.e. facing the outside environment and therefore incoming solar light contacts this substrate first. Also, the light diffusing layer or the light redirecting layer can be disposed on either major surface of the first glazing substrate. The first glazing substrate has two major surfaces, one that face the outside environment and one that faces the second glazing substrate. Similarly, the companion layer that is disposed on the second glazing substrate can be disposed on either major surface of the second glazing substrate. The two major surfaces of the second glazing substrate are the surface that faces the interior of the room and the surface that faces the first glazing substrate.

In some embodiments, the light diffusing layer and the light redirecting layer are disposed on the glazing substrates such that the layers are facing each other. In this way, both of the layers face the intervening space and are not exposed to either the outside environment or the interior room environment. This configuration can protect the layers from scratching, abrasion, weathering, soiling and similar conditions.

Some specific embodiments of hybrid constructions comprising at least two glazing substrates with the diffusive layer and light redirecting layer each disposed on one of the glazing substrates with an intervening space present between the diffusive layer and the light redirecting layer, are illustrated in FIGS. 9-12.

Figure 9:
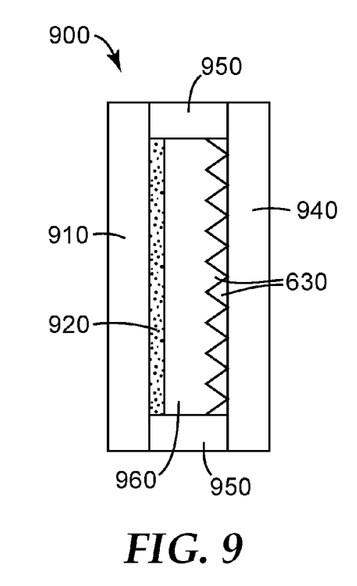
FIG. 9 shows a cross-sectional view of a hybrid light redirecting and light diffusing construction of this disclosure.

In FIG. 9, hybrid construction 900 comprises first glazing substrate 910 and second glazing substrate 940, visible light diffusing layer 920 disposed on first glazing substrate 910, light redirecting layer 930 disposed on second glazing substrate 940, and intervening space 960 between visible light diffusing layer 920 and light redirecting layer 930. This construction is configured such that incoming solar light may contact either first glazing substrate 910 or second glazing substrate 940 first. In some embodiments, layers of optically clear adhesive can be used to adhere visible light diffusing layer 920 to first glazing substrate 910 (not shown) and/or to adhere light redirecting layer 930 to second glazing substrate 940 (not shown). As described above, visible light diffusing layer 920 may be a film or coating, a textured surface or topography on first glazing substrate 910, or a visible light diffusing substrate. The intervening space 960 may be a vacuum space or may be filled with, for example air or other gas. To isolate intervening space 960 from the external environment, optional sealing members 950 may be used.

Figure 10:
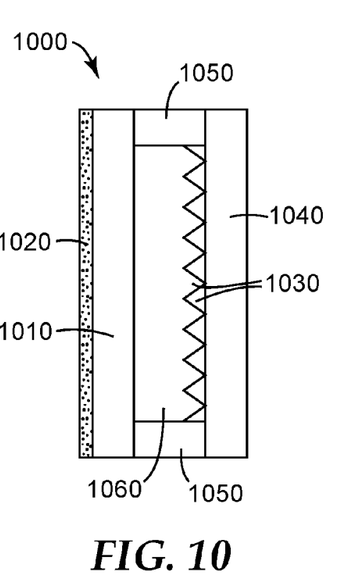
FIG. 10 shows a cross-sectional view of a hybrid light redirecting and light diffusing construction of this disclosure.

In FIG. 10, hybrid construction 1000 comprises first glazing substrate 1010 and second glazing substrate 1040, visible light diffusing layer 1020 disposed on first glazing substrate 1010, light redirecting layer 1030 disposed on second glazing substrate 1040, and intervening space 1060 between first glazing substrate 1010 and light redirecting layer 1030. This construction is configured such that incoming solar light may contact either light diffusing layer 1020 or second glazing substrate 1040 first. In some embodiments, layers of optically clear adhesive can be used to adhere visible light diffusing layer 1020 to first glazing substrate 1010 (not shown) and/or to adhere light redirecting layer 1030 to second glazing substrate 1040 (not shown). As described above, visible light diffusing layer 1020 may be a film or coating, a textured surface or topography on first glazing substrate 1010, or a visible light diffusing substrate. The intervening space 1060 may be a vacuum space or may be filled with, for example air or other gas. To isolate intervening space 1060 from the external environment, optional sealing members 1050 may be used.

Figure 11:
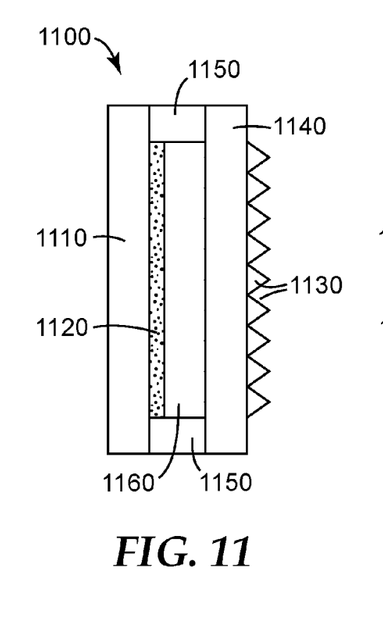
FIG. 11 shows a cross-sectional view of a hybrid light redirecting and light diffusing construction of this disclosure.

In FIG. 11, hybrid construction 1100 comprises first glazing substrate 1110 and second glazing substrate 1140, visible light diffusing layer 1120 disposed on first glazing substrate 1110, light redirecting layer 1130 disposed on second glazing substrate 1140, and intervening space 1160 between visible light diffusing layer 1120 and second glazing substrate 1140. This construction is configured such that incoming solar light may contact either first glazing substrate 1110 or light redirecting layer 1130 first. In some embodiments, layers of optically clear adhesive can be used to adhere visible light diffusing layer 1120 to first glazing substrate 1110 (not shown) and/or to adhere light redirecting layer 1130 to second glazing substrate 1140 (not shown). As described above, visible light diffusing layer 1120 may be a film or coating, a textured surface or topography on first glazing substrate 1110, or a visible light diffusing substrate. The intervening space 1160 may be a vacuum space or may be filled with, for example air or other gas. To isolate intervening space 1160 from the external environment, optional sealing members 1150 may be used.

Figure 12:
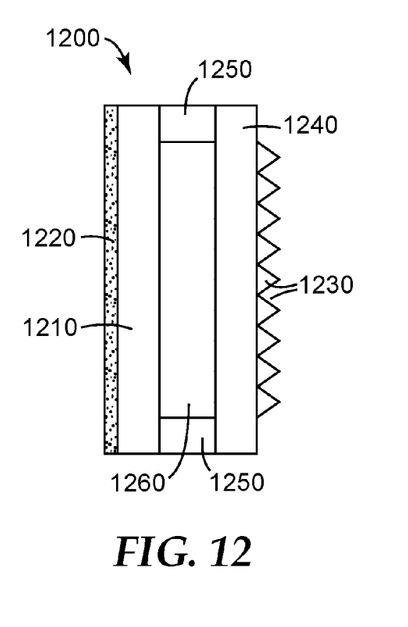
FIG. 12 shows a cross-sectional view of a hybrid light redirecting and light diffusing construction of this disclosure.

In FIG. 12, hybrid construction 1200 comprises first glazing substrate 1210 and second glazing substrate 1240, visible light diffusing layer 1220 disposed on first glazing substrate 1210, light redirecting layer 1230 disposed on second glazing substrate 1240, and intervening space 1260 between first glazing substrate 1210 and second glazing substrate 1240. This construction is configured such that incoming solar light may contact either visible light diffusing layer 1220 or light redirecting layer 1230 first. In some embodiments, layers of optically clear adhesive can be used to adhere visible light diffusing layer 1220 to first glazing substrate 1210 (not shown) and/or to adhere light redirecting layer 1230 to second glazing substrate 1240 (not shown). As described above, visible light diffusing layer 1220 may be a film or coating, a textured surface or topography on first glazing substrate 1210, or a visible light diffusing substrate. The intervening space 1260 may be a vacuum space or may be filled with, for example air or other gas. To isolate intervening space 1260 from the external environment, optional sealing members 1250 may be used.

As with the other embodiments described above, these hybrid constructions can also contain additional optional layers and substrates, as long as these layers and substrates do not interfere with the light redirection and diffusion properties of the hybrid constructions. Suitable optional layers and substrates have been described above.

This disclosure includes the following embodiments.

Among the embodiments are solar light redirecting glazing units. A first embodiment includes a solar light redirecting glazing unit, comprising: a first glazing substrate; a visible light diffusing layer disposed on the first glazing substrate; and a light redirecting layer adjacent to the visible light diffusing layer, the light redirecting layer comprising a major surface forming a plurality of prism structures, and wherein the visible light diffusing layer and light redirecting layer are oriented such that incoming solar light contacts the visible light diffusing layer before contacting the light redirecting layer.

Embodiment 2 is the solar light redirecting glazing unit of embodiment 1, wherein the visible light diffusing layer comprises a visible light diffusing film or a visible light diffusing glazing substrate.

Embodiment 3 is the solar light redirecting glazing unit of embodiment 1 or 2, wherein the visible light diffusing layer and the light redirecting layer are attached to each other to form a solar light redirecting construction.

Embodiment 4 is the solar light redirecting glazing unit of any of embodiments 1-3, wherein the visible light diffusing layer and the light redirecting layer comprise polymeric films.

Embodiment 5 is the solar light redirecting glazing unit of any of embodiments 1-4, wherein the first glazing substrate has a surface area value and the solar light redirecting construction is disposed on only a portion of the surface area value.

Embodiment 6 is the solar light redirecting glazing unit of any of embodiments 1-5, wherein the plurality of prism structures comprises a plurality of asymmetric prisms.

Embodiment 7 is the solar light redirecting glazing unit of any of embodiments 1-6, wherein the visible light diffusing layer comprises a patterned light diffusing layer.

Embodiment 8 is the solar light redirecting glazing unit of any of embodiments 1-7, wherein the light redirecting layer comprises a patterned light redirecting layer.

Embodiment 9 is the solar light redirecting glazing unit of any of embodiments 1-8, further comprising at least one additional layer.

Embodiment 10 is the solar light redirecting glazing unit of embodiment 9, wherein the at least one additional layer comprises a low E layer, an infrared light rejecting layer, a color or tinting layer, or combination thereof.

Embodiment 11 is the solar light redirecting glazing unit of embodiment 10, wherein the infrared light rejecting layer comprises an infrared light rejecting multi-layer film, an infrared light rejecting coating, or combination thereof.

Embodiment 12 is the solar light redirecting glazing unit of embodiment 11, wherein the infrared light rejecting layer reflects infrared light, absorbs infrared light, or combination thereof.

Embodiment 13 is the solar light redirecting glazing unit of any of embodiments 1-12, further comprising at least one additional glazing substrate.

Embodiment 14 is the solar light redirecting glazing unit of any of embodiments 1-13, wherein the visible light transmission (% T) of the solar light redirecting glazing unit is at least 50%.

Embodiment 15 is the solar light redirecting glazing unit of any of embodiments 1-14, wherein the visible light transmission (% T) of the solar light redirecting glazing unit is at least 60%.

Embodiment 16 is the solar light redirecting glazing unit of any of embodiments 1-15, wherein the visible light transmission (% T) of the solar light redirecting glazing unit is at least 70%.

Embodiment 17 is the solar light redirecting glazing unit of any of embodiments 1-16, wherein the visible light transmission (% T) of the solar light redirecting glazing unit is at least 80%.

Embodiment 18 is the solar light redirecting glazing unit of any of embodiments 1-17, wherein the visible light transmission (% T) of the solar light redirecting glazing unit is at least 85%.

Embodiment 19 is the solar light redirecting glazing unit of any of embodiments 1-18, wherein the visible light transmission (% T) of the solar light redirecting glazing unit is at least 90%.

Embodiment 20 is the solar light redirecting glazing unit of any of embodiments 1-19, wherein the visible light transmission (% T) of the solar light redirecting glazing unit is at least 95%.

Embodiment 21 is the solar light redirecting glazing unit of any of embodiments 1-20, wherein the haze of the solar light redirecting glazing unit is at least 10%.

Embodiment 22 is the solar light redirecting glazing unit of any of embodiments 1-21, wherein the haze of the solar light redirecting glazing unit is at least 15%. Embodiment 23 is the solar light redirecting glazing unit of any of embodiments 1-22, wherein the haze of the solar light redirecting glazing unit is at least 20%.

Embodiment 24 is the solar light redirecting glazing unit of any of embodiments 1-23, wherein the haze of the solar light redirecting glazing unit is at least 30%.

Embodiment 25 is the solar light redirecting glazing unit of any of embodiments 1-24, wherein the haze of the solar light redirecting glazing unit is at least 40%.

Embodiment 26 is the solar light redirecting glazing unit of any of embodiments 1-25, wherein the clarity of the solar light redirecting glazing unit is in the range of 10-99%.

Embodiment 27 includes a solar light redirecting glazing unit, comprising: a first glazing substrate; a patterned visible light diffusing layer; and a light redirecting layer adjacent to the visible light diffusing layer wherein the light redirecting layer comprising a major surface forming a plurality of prism structures.

Embodiment 28 is the solar light redirecting glazing unit of embodiment 27, wherein the patterned visible light diffusing layer and the light redirecting layer adjacent to the visible light diffusing layer form a composite construction.

Embodiment 29 is the solar light redirecting glazing unit of embodiment 27 or 28, wherein the patterned visible light diffusing layer comprises a patterned visible light diffusing film or patterned visible light diffusing glazing substrate.

Embodiment 30 is the solar light redirecting glazing unit of any of embodiments 27-29, wherein the patterned visible light diffusing film comprises a film with diffusive stripes, regular geometric shapes, or irregular geometric shapes.

Embodiment 31 is the solar light redirecting glazing unit of any of embodiments 27-30, wherein the patterned visible light diffusing layer and the light redirecting layer adjacent to the visible light diffusing layer are arranged such that incoming solar light contacts the light redirecting layer before contacting the visible light diffusing layer.

Embodiment 32 is the solar light redirecting glazing unit of any of embodiments 27-30, wherein the patterned visible light diffusing layer and the light redirecting layer adjacent to the visible light diffusing layer are arranged such that incoming solar light contacts the visible light diffusing layer before contacting the light redirecting layer.

Embodiment 33 is the solar light redirecting glazing unit of any of embodiments 27-32, wherein the plurality of prism structures comprises a plurality of asymmetric prisms.

Embodiment 34 is the solar light redirecting glazing unit of any of embodiments 27-33, further comprising at least one additional layer.

Embodiment 35 is the solar light redirecting glazing unit of embodiment 34, wherein the at least one additional layer comprises a low E layer, an infrared light rejecting layer, a color or tinting layer, or combination thereof.

Embodiment 36 is the solar light redirecting glazing unit of embodiment 35, wherein the infrared light rejecting layer comprises an infrared light rejecting multi-layer film, an infrared light rejecting coating, or combination thereof.

Embodiment 37 is the solar light redirecting glazing unit of embodiment 36, wherein the infrared light rejecting layer reflects infrared light, absorbs infrared light, or combination thereof.

Embodiment 38 is the solar light redirecting glazing unit of any of embodiments 27-37, further comprising at least one additional glazing substrate.

Embodiment 39 is the solar light redirecting glazing unit of any of embodiments 27-38, wherein the visible light transmission (% T) of the solar light redirecting glazing unit is at least 50%.

Embodiment 40 is the solar light redirecting glazing unit of any of embodiments 27-39, wherein the visible light transmission (% T) of the solar light redirecting glazing unit is at least 60%.

Embodiment 41 is the solar light redirecting glazing unit of any of embodiments 27-40, wherein the visible light transmission (% T) of the solar light redirecting glazing unit is at least 70%.

Embodiment 42 is the solar light redirecting glazing unit of any of embodiments 27-41, wherein the visible light transmission (% T) of the solar light redirecting glazing unit is at least 80%.

Embodiment 43 is the solar light redirecting glazing unit of any of embodiments 27-42, wherein the visible light transmission (% T) of the solar light redirecting glazing unit is at least 85%.

Embodiment 44 is the solar light redirecting glazing unit of any of embodiments 27-43, wherein the visible light transmission (% T) of the solar light redirecting glazing unit is at least 90%.

Embodiment 45 is the solar light redirecting glazing unit of any of embodiments 27-44, wherein the visible light transmission (% T) of the solar light redirecting glazing unit is at least 95%.

Embodiment 46 is the solar light redirecting glazing unit of any of embodiments 27-45, wherein the haze of the solar light redirecting glazing unit is at least 10%.

Embodiment 47 is the solar light redirecting glazing unit of any of embodiments 27-46, wherein the haze of the solar light redirecting glazing unit is at least 15%.

Embodiment 48 is the solar light redirecting glazing unit of any of embodiments 27-47, wherein the haze of the solar light redirecting glazing unit is at least 20%.

Embodiment 49 is the solar light redirecting glazing unit of any of embodiments 27-48, wherein the haze of the solar light redirecting glazing unit is at least 30%.

Embodiment 50 is the solar light redirecting glazing unit of any of embodiments 27-49, wherein the haze of the solar light redirecting glazing unit is at least 40%.

Embodiment 51 is the solar light redirecting glazing unit of any of embodiments 27-50, wherein the clarity of the solar light redirecting glazing unit is in the range of 10-99%.

Embodiment 52 includes a solar light redirecting glazing unit, comprising: a first glazing substrate comprising a first major surface and a second major surface; a solar light redirecting layer disposed on the first major surface of the first glazing substrate, the solar light redirecting layer comprising a major surface forming a plurality of prism structures; a second glazing substrate comprising a first major surface and a second major surface; a visible light diffusing layer disposed on the first major surface of the second glazing substrate: and an intervening space between the solar light redirecting layer and the visible light diffusing layer.

Embodiment 53 is the solar light redirecting glazing unit of embodiment 52, wherein the first major surface of the first glazing substrate is directed towards the first major surface of the second glazing substrate.

Embodiment 54 is the solar light redirecting glazing unit of embodiment 52 or 53, wherein the glazing unit is arranged such that incoming solar light contacts the visible light diffusing layer before contacting the light redirecting layer.

Embodiment 55 is the solar light redirecting glazing unit of any of embodiments 52-53, wherein the glazing unit is arranged such that incoming solar light contacts the light redirecting layer before contacting the visible light diffusing layer.

Embodiment 56 is the solar light redirecting glazing unit of any of embodiments 52-55, wherein the first major surface of the first glazing substrate is directed away from the first major surface of the second glazing substrate.

Embodiment 57 is the solar light redirecting glazing unit of any of embodiments 52-56, wherein the plurality of prism structures comprises a plurality of asymmetric prisms.

Embodiment 58 is the solar light redirecting glazing unit of any of embodiments 52-57, further comprising at least one additional layer.

Embodiment 59 is the solar light redirecting glazing unit of embodiment 58, wherein the at least one additional layer comprises a low E layer, an infrared light rejecting layer, a color or tinting layer, or combination thereof.

Embodiment 60 is the solar light redirecting glazing unit of embodiment 59, wherein the infrared light rejecting layer comprises an infrared light rejecting multi-layer film, an infrared light rejecting coating, or combination thereof.

Embodiment 61 is the solar light redirecting glazing unit of embodiment 60, wherein the infrared light rejecting layer reflects infrared light, absorbs infrared light, or combination thereof.

Embodiment 62 is the solar light redirecting glazing unit of any of embodiments 52-61, further comprising at least one additional glazing substrate.

Embodiment 63 is the solar light redirecting glazing unit of any of embodiments 52-62, wherein the visible light transmission (% T) of the solar light redirecting glazing unit is at least 50%.

Embodiment 64 is the solar light redirecting glazing unit of any of embodiments 52-63, wherein the visible light transmission (% T) of the solar light redirecting glazing unit is at least 60%.

Embodiment 65 is the solar light redirecting glazing unit of any of embodiments 52-64, wherein the visible light transmission (% T) of the solar light redirecting glazing unit is at least 70%.

Embodiment 66 is the solar light redirecting glazing unit of any of embodiments 52-65, wherein the visible light transmission (% T) of the solar light redirecting glazing unit is at least 80%.

Embodiment 67 is the solar light redirecting glazing unit of any of embodiments 52-66, wherein the visible light transmission (% T) of the solar light redirecting glazing unit is at least 85%.

Embodiment 68 is the solar light redirecting glazing unit of any of embodiments 52-67, wherein the visible light transmission (% T) of the solar light redirecting glazing unit is at least 90%.

Embodiment 69 is the solar light redirecting glazing unit of any of embodiments 52-68, wherein the visible light transmission (% T) of the solar light redirecting glazing unit is at least 95%.

Embodiment 70 is the solar light redirecting glazing unit of any of embodiments 52-69, wherein the haze of the solar light redirecting glazing unit is at least 10%.

Embodiment 71 is the solar light redirecting glazing unit of any of embodiments 52-70, wherein the haze of the solar light redirecting glazing unit is at least 15%.

Embodiment 71 is the solar light redirecting glazing unit of any of embodiments 52-70, wherein the haze of the solar light redirecting glazing unit is at least 20%.

Embodiment 72 is the solar light redirecting glazing unit of any of embodiments 52-71, wherein the haze of the solar light redirecting glazing unit is at least 30%.

Embodiment 73 is the solar light redirecting glazing unit of any of embodiments 52-72, wherein the haze of the solar light redirecting glazing unit is at least 40%.

Embodiment 74 is the solar light redirecting glazing unit of any of embodiments 52-73, wherein the clarity of the solar light redirecting glazing unit is in the range of 10-99%.

EXAMPLES

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: cm=centimeter; in=inch; mm=millimeter. Solvents and other reagents used were obtained from Sigma-Aldrich Chemical Company; Milwaukee, Wis. unless otherwise noted.

Optical Measurements

Transmission, haze and clarity of the specimens were measured using a "HAZE-GARD PLUS" (BYK-Gardner, Columbia, Md.) according to test method ASTM D1003.

BTDF (bi-directional transmission distribution function) was measured using a commercially available "IS-SA" imaging sphere system from Radiant Imaging, Redmond, Wash. BTDF was measured with an incident angle of 60 degrees elevation. BTDF for deflection up was measured at the brightest angle as indicated in Table 2 which varies slightly from sample to sample due to glass alignment and normal measurement variation.

Preparation of Structured Light Redirecting Layer

A master tool having the negative of the desired linear grooves and prismatic elements (with a cross section similar to FIG. 1) was obtained using a diamond turning process. A UV curable resin composition was prepared by blending 74 parts by weight of an aliphatic urethane acrylate oligomer, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-propanone), commercially available under the trade designation "DAROCUR 1173" from Ciba, Basel, Switzerland. A 76 micrometer (3 mil) thick PET (polyethylene terephthalate) film, commercially available from DuPont Teijin Films, Hopewell, Va. under the trade designation "MELINEX 453", was coated with the UV curable resin to an approximate thickness of 85 micrometers. The coated film was placed in physical communication with the master tool such that the grooves were void of any air. The resin was cured while in physical communication with the master tool with a microwave powered UV curing system available from Fusion UV systems, Gaithersburg, Md. The cured resin on the web was removed from the master tool resulting in a microstructured film. One liner of a 25 micrometer (1 mil) thick optically clear adhesive transfer tape, commercially available from 3M Company, St. Paul, Minn. under the trade designation "3M OPTICALLY CLEAR ADHESIVE 8171", was removed and the exposed adhesive surface was laminated to the non-structured side of the microstructured film in a roll-to-roll laminator available from Protech Engineering, Wilmington, Del. A multilayer film article as disclosed on pages 5-6 of US Patent Publication No. 2006/0154049 was laminated to the structured side of the microstructured film to produce the final light redirecting film laminate.

Preparation of Solar Light Redirecting Glazing Unit

For Examples 1 and 2 (Ex1 and Ex2) and Comparative Example 1 (CE1) the film described under "Structured Light Redirecting Layer" was coated with an acrylic pressure sensitive adhesive in a web coater to obtain an approximately 8 micrometer thick adhesive layer on the opposite side of the structured film. The film was applied to a 3 in square (7.6 cm square) clear 3 mm float glass using a roller to obtain bubble-free application.

For EX1 and EX2 respectively, "3M FASARA DESIGN FILM SH2EM LAUSENNE" and "3M FASARA DESIGN FILM SH2CH MAT CRYSTAL i" architectural decorating films commercially available from 3M Company, St. Paul, Minn. were applied to a second piece of 3 inch square (7.6 cm square) 3 mm float glass. CE1 had no diffusing film applied but instead used plain 3 mm plate glass as the second pane.

For EX1 and EX2 "3M DOUBLE SIDED FOAM TAPE 4408", commercially available from 3M Company, St. Paul, Minn., was applied along the four sides of the glass specimen with the diffusing film for EX1 and EX2 and the plain plate glass for CE1. The previously prepared glass sample having structured film was adhered on the vinyl tape to obtain the double pane structure of FIG. 9 for EX1 and EX2. CE1 was missing the diffusing film 620 of FIG. 9.

Haze, clarity, % transmission (% T) and BTDF were measured as described under "Optical Measurements" and are shown in Tables 1. Measurements were made with the light source on the daylighting film side. Lower BTDF deflection down indicates reduced glare.

TABLE 1

| | % T | Haze | Clarity | BTDF deflection up | BTDF deflection down |
|---|---|---|---|---|---|
| EX1 | 88 | 40 | 54 | 12.37 (at 44.8 degree up) | 1.52 (at 18.7 degree down) |
| EX2 | 89 | 56 | 19 | 3.0 (at 46.2 degree up) | 0.7 (at 18.7 degree down) |
| CE1 | 92 | 1 | 99.5 | 83.7 (at 45.2 degree up) | 4.94 (at 18.7 degree down) |

What is claimed is:

1. A composite multilayer construction comprising:
a window on the exterior surface of a building and adjacent to a room or a corridor, comprising:
a first glazing substrate; and
a solar light redirecting construction disposed on the first glazing substrate, wherein the solar light redirecting construction comprises:
a visible light diffusing layer; and
a light redirecting layer, wherein the layers are laminated together, and wherein the light redirecting layer comprises a major surface with a microstructured surface, the microstructured surface comprising forming a plurality of prism structures wherein the plurality of prism structures comprises a plurality of asymmetric prisms.

2. The composite multilayer construction of claim 1, wherein the visible light diffusing layer and the light redirecting layer comprise polymeric films.

3. The composite multilayer construction of claim 1, wherein the visible light diffusing layer comprises a patterned visible light diffusing layer.

4. The composite multilayer construction of claim 3, wherein the patterned visible light diffusing film comprises a film with diffusive stripes, regular geometric shapes, or irregular geometric shapes.

5. The composite multilayer construction of claim 1, further comprising at least one additional layer.

6. The composite multilayer construction of claim 5, wherein the at least one additional layer comprises a low E layer, an infrared light rejecting layer, a color or tinting layer, an adhesive layer, or combination thereof.

7. The composite multilayer construction of claim 6, wherein the at least one additional layer comprises an infrared rejecting layer comprising an infrared light rejecting multi-layer film, an infrared light rejecting coating, or combination thereof.

8. The composite multilayer construction of claim 7, wherein the infrared light rejecting layer reflects infrared light, absorbs infrared light, or combination thereof.

9. The composite multilayer construction of claim 1, wherein the light redirecting layer comprises a patterned light redirecting layer.

* * * * *